UNITED STATES PATENT OFFICE.

LOUIS ENRICHT, OF NEW YORK, N. Y., ASSIGNOR TO THE ENRICHT MANUFACTURING COMPANY, OF SAME PLACE.

ARTIFICIAL STONE OR CEMENT.

SPECIFICATION forming part of Letters Patent No. 448,514, dated March 17, 1891.

Application filed May 16, 1890. Serial No. 352,073. (No specimens.)

*To all whom it may concern:*

Be it known that I, LOUIS ENRICHT, a citizen of the United States, residing at New York, in the county and State of New York, have invented new and useful Improvements in Artificial Stone or Cement, of which the following is a specification.

This invention relates to a composition of matter serviceable for use as artificial stone or cement, as set forth in the following specification and claim.

The composition consists of the following ingredients: aqueous solution magnesium chloride, 35° Baumé, ten ounces; sulphate of aluminium, two and one-half ounces; magnesium oxide, fifteen ounces. These substances are thoroughly mixed and when the mixture is to be used as a cement it must be used while still in a wet or plastic state. If the mixture is to be used for stone, said mixture is molded or shaped into the required form and then allowed to dry, whereby the mixture becomes set or hard. It sets at ordinary temperature in about from ten to sixteen hours.

What I claim as new, and desire to secure by Letters Patent, is—

The herein-described composition of matter to be used for stone or cement, consisting of an aqueous solution of magnesium chloride, sulphate of aluminium, and magnesium oxide, substantially as and about in the proportions herein described.

In testimony whereof I have hereunto set my hand in the presence of two subscribing witnesses.

LOUIS ENRICHT.

Witnesses:
WM. C. HAUFF,
E. F. KASTENHUBER.